Patented July 7, 1931

1,813,886

UNITED STATES PATENT OFFICE

HOMER BEHM, OF BELMAR, NEW JERSEY

PROCESS OF PRODUCING OIL-SOLUBLE MATERIAL AND PRODUCT THEREOF

No Drawing.   Application filed January 16, 1928.   Serial No. 247,266.

The present invention relates to the production of a material suitable for use as an addition to gasoline or other combustible mineral oil material, and also may be used in accordance with the disclosure of my copending application Ser. No. 575,040 filed July 14, 1922, referred to in my Patent No. 1,541,242. In the process of said application, I add a small amount of the composition to a large bulk of kerosene or other mineral oil, and a small percent of water is added, the mixture is then aerated for a considerable time, preferably for several days, and the mixture then slightly acidulated.

In accordance with the process of the present case an oil-soluble product is produced suitable for either of the above uses.

In my said prior case I have disclosed a process in which two liquids are made, the first containing the reaction products of kerosene or other mineral oil material, slaked lime, rosin, ammonia, formaldehyde and a little water, the second containing the reaction products of alcohol, acetone, tincture of iodine, slaked lime and powdered rosin. These two are brought together, subsequently chlorinated lime is added and also turpentine.

In the present invention I may use materials the same or similar to the above, but I use these materials in considerably different proportions from the proportions specified in the said prior patent, whereby I am able to produce a far better product and to produce the product in a more uniform condition.

Example

For each gallon (128 fluid ounces) of kerosene, I add 1 ounce of powdered pure quick lime (or sometimes a somewhat larger amount of slaked lime). I then add 4 ounces of coarsely ground rosin (say from the size of particles of granulated sugar up to the size of wheat) and I then stir the mixture. I add 30 or 32 ounces of strong ammonia water (about 25% strength) and 16 or 18 ounces of 40% formaldehyde solution, the ammonia and the formaldehyde solution being added while the temperature of the liquid is preferably below 60° F. The entire mixture is then allowed to stand for 24 hours at below 60° F. Due to the reactions taking place, there is formed a material of a jelly-like consistency in the mineral oil or kerosene. The jelly will be found to have separated to some extent, a more or less hard layer of the jelly being formed on the top, which may be half an inch thick or so. The entire body of the kerosene may contain more or less flakes of somewhat softer jelly-like material and in the lower part of the kerosene that may be a more or less thread-like formation of jelly-like mass, which may extend clear to the bottom of the kerosene. Not all of the rosin and lime have gone into solution. There will be some water produced or liberated, this being apparently the water which originally held the ammonia and formaldehyde in solution (this being shown by the volume of the water) and this will settle to the bottom of the tank, and a part of this water, say about three-fourths, can readily be drawn off at this stage. The jelly in question is not separated but is left in the oil. There is then added, for each gallon of the original kerosene, 1 pound to 1.5 lbs. of chlorinated lime (25% strength). The liquid gets warm a little, gas is given off with a strong odor, at the beginning, and the liquid gives a noise similar to a boiling liquid, this being apparently in the bottom of the vessel. The temperature may go up to 125° F., or so, during this operation. The action of the chlorinated lime causes the jelly to liquefy or dissolve in the oil, this does not take place immediately, but may require an hour or so. The liquid will be an orange or reddish yellow color at this stage. I let the liquid stand until it cools down to atmospheric temperature which may take about 3 hours in winter temperature (say about freezing temperature), or longer in warm weather.

Then I may add 1 quart of turpentine, and allow the mixture to stand for 4 to 5 hours. This turpentine however may be omitted, also the delay of 4-5 hours. Then I add 2 quarts (64 ounces) or more, of acetone and stir the mixture. A reaction appears to take place and the chlorinated lime (or the white oil-insoluble reaction products of the same) swells a good deal but does not dissolve.

Then I add 6 ounces of glacial acetic acid (preferably previously mixed with say 12 ounces of gasoline) and let the mixture stand for 12 to 14 hours (say over night). The entire mixture is then stirred and filtered. This stirring may cause a slight rise in temperature. The material which I remove by this filtration is a wet pasty white mass, containing some water and the white solid material left from the chlorinated lime.

Six (6) ounces of acetic acid of about 97–98% strength mixed with 12 ounces of acetone are then added to the filtered liquid from above. The liquid is then well agitated and allowed to stand for 12 hours. I call attention to the fact that the quantity of acetic acid last mentioned should be sufficient to make the product slightly acid to litmus. Some reaction takes place, and a very soft, jelly-like material forms gradually in the oily material, which settles out slowly and which gradually hardens somewhat. The oily material is then filtered to remove this jelly-like material. This jelly-like material somewhat resembles ordinary "Vaseline" in appearance but may be a little softer than "Vaseline" and on rubbing between the hands it develops a somewhat sticky feel. It is readily soluble in gasoline. This gelatinous mass can be used as a soap in dry-cleaning operations. The quantity of this gelatinous material will vary a good deal depending upon the oil under treatment.

I preferably use as the starting material, either well refined kerosene or well refined gasoline and when using a good grade of gasoline the amount of the gelatinous material may be about 6 ounces per gallon of gasoline, and when using a good grade of kerosene the amount of gelatinous material may be as much as 10 to 12 ounces, per gallon of kerosene.

A distillation test made at this point will show that the end boiling point of the mixture is considerably lower than that of the kerosene or gasoline used. Thus in a test run using kerosene, the end boiling point was shown to be about 500° F., whereas the end boiling point of the original kerosene used was about 565° F. The end boiling point will likewise be lowered somewhat if a gasoline is used as the starting material.

The liquid from this last filtration constitutes a suitable substance to be added to gasoline or other mineral oil material which is to be burned. The material can be added to gasoline which is to be used in internal combustion engines and the like, or it can be added to kerosene or fuel oils which are to be used for fuel, and in both cases the combustion of the material is improved. Without restricting myself to the exact quantity to be added, tests have shown that about 1 part of the material to 1,000 parts of the gasoline gives satisfactory results. This corresponds to about 1 ounce of the material to 8 gallons of the gasoline. When adding this material to kerosene or fuel oil I may use larger proportions, say 1 ounce to 3 gallons of kerosene for burning in stoves, or one ounce to 2 gallons of heavy fuel oil.

In practice I have found that very good results are secured when all of the operations above referred to are conducted in a covered metallic receptacle, such as a tinned iron receptacle, although I do not wish to limit myself to the use of such a receptacle. The usual lead-lined covered agitator tank in general use in refinery practice also would be suitable.

It is to be understood that the quantities above mentioned are all to be used with 1 gallon of the original kerosene or gasoline. It would be possible to use heavier oils instead of gasoline or kerosene but my experience indicates that gasoline is usually better than kerosene and that heavier oils than kerosene are less suitable than kerosene.

In the two steps where acids are employed, it is found to be very advisable to use acetic acid rather than mineral acids, even though acetic acid is considerably more expensive.

In the above description where I have referred to ounces, fluid ounces are intended (volumetric ounces).

I have above spoken of the addition of rosin in a granular state. Experimentation has shown that the results when using the rosin in a granular state are much better than when using the rosin in a powdered state.

In all of the above steps, when no reference is made to specific temperatures, the steps can be conveniently carried out at ordinary atmospheric out-of-doors temperature.

I have above referred to filtering twice during the operations. The first filtration can be conducted through ordinary filter paper or through fine cloth, or in place of filtering, the material can be decanted substantially free from insoluble material, or other operations can be conducted to separate the insoluble material. The second filtration, at the end of the process, is preferably a filtration through fine filter paper although obviously other methods could be employed such as passing through a centrifugal separator or the like.

Where "turpentine" is referred to herein, ordinary "spirits of turpentine", e. g. of the grade used in paints or "rectified oil of turpentine" may be used.

During the processing of the material, as well as during the storage of the finished product, the entire product is preferably kept away from sunlight and from other strong light and hence I have referred above to the use of a metallic receptacle, which is also preferably provided with a tight fitting cover of the same material. However I do not preclude the presence of some light, which (particularly in the early stages of the process) is not especially injurious.

I claim:—

1. A product containing the oil-soluble reaction products of a petroleum produce not substantially heavier than kerosene, lime, rosin, ammonia, formaldehyde, chlorinated lime, acetone and acetic acid, said petroleum product being the largest component, but amounting to substantially less than all the other components.

2. A product containing the oil-soluble reaction products of a petroleum product not substantially heavier than kerosene, lime, rosin, ammonia, formaldehyde, chlorinated lime, acetone and acetic acid, the amount of ammonia being substantially greater than the amount of formaldehyde, said petroleum product being the largest component, but amounting to substantially less than all the other components.

3. A product containing the oil-soluble products of reaction of the following materials in about the proportions stated:

| | |
|---|---|
| Light petroleum distillates | 1 gallon, |
| Lime | 1 ounce, |
| Rosin | 2 ounces, |
| Strong ammonia water | 30 to 32 ounces, |
| Strong formaldehyde solution | 16 to 18 ounces, |
| Chlorinated lime | 1 to 1.5 pounds, |
| Acetone | 76 ounces, and |
| Acetic acid | 12 ounces, | such product being substantially free from insoluble matter.

4. A process which comprises adding to a petroleum distillate not heavier than kerosene, lime and granulated rosin, mixing, adding strong ammonia water and formaldehyde solution, at below 60° F., letting stand for several hours, drawing off some of the water settled out, adding chlorinated lime, cooling, letting stand for several hours, adding acetone, letting stand for several hours, adding acetic acid, separating insoluble material, adding acetic acid and acetone to acid reaction, letting stand for several hours and separating insoluble material.

5. A product containing the oil-soluble products of reaction of the following materials in about the proportions stated:

| | |
|---|---|
| Light petroleum distillates | 1 gallon, |
| Lime | 1 ounce, |
| Rosin | 2 ounces, |
| Strong ammonia water | 30 to 32 ounces, |
| Strong formaldehyde solution | 16 to 18 ounces, |
| Chlorinated lime | 1 to 1.5 pounds, |
| Turpentine | 32 ounces, |
| Acetone | 76 ounces, and |
| Acetic acid | 12 ounces, | such product being substantially free from insoluble matter.

6. A process which comprises adding to a petroleum distillate not heavier than kerosene, lime and granulated rosin, mixing, adding strong ammonia water and formaldehyde solution, at below 60° F., letting stand for several hours, drawing off some of the water settled out, adding chlorinated lime, cooling, letting stand for several hours, adding turpentine and letting stand for several hours, adding acetone, letting stand for several hours, adding acetic acid, separating insoluble material, adding acetic acid and acetone to acid reaction, letting stand for several hours and separating insoluble material.

7. The process herein described which comprises adding to each gallon of oil at least as volatile as kerosene, about an ounce of lime and about two ounces of rosin, mixing, adding about 30 to 32 ounces of strong ammonia water and about 16 to 18 ounces of formaldehyde solution, while cold, allowing to stand for several hours, adding about 1 lb. to 1.5 lbs. of chlorinated lime, cooling, allowing to stand for several hours, adding at least about a quart of acetone, adding a few ounces of an acid, allowing to stand for several hours, separating the solids and the liquids and to the latter adding a mixture of acetone and acid, in amount sufficient to render the liquid slightly acid in reaction, allowing the liquid to stand long enough for the formation of a jelly-like material and separating the latter from the liquid.

8. The process herein described which comprises adding to each gallon of oil at least as volatile as kerosene, about an ounce of lime and about two ounces of rosin, mixing, adding about 30 to 32 ounces of strong ammonia water and about 16 to 18 ounces of formaldehyde solution, while cold, allowing to stand for several hours, adding about 1 lb. to 1.5 lbs. of chlorinated lime, cooling, allowing to stand for several hours, adding about a quart of turpentine, allowing to stand for several hours, adding at least about a quart of acetone, adding a few ounces of an acid, allowing to stand for several hours, separating the solids and the liquids and to the latter adding a mixture of acetone and acid, in amount sufficient to render the liquid slightly acid in reaction, allowing the liquid to stand long enough for the formation of a jelly-like material, and separating the latter from the liquid.

In testimony whereof I affix my signature.

HOMER BEHM.